(12) United States Patent
Bragg et al.

(10) Patent No.: US 6,988,550 B2
(45) Date of Patent: Jan. 24, 2006

(54) SOLIDS-STABILIZED OIL-IN-WATER EMULSION AND A METHOD FOR PREPARING SAME

(75) Inventors: James R. Bragg, Houston, TX (US); Ramesh Varadaraj, Flemington, NJ (US)

(73) Assignee: ExxonMobil Upstream Research Company, Houston, TX (US)

( * ) Notice: Subject to any disclaimer, the term of this patent is extended or adjusted under 35 U.S.C. 154(b) by 384 days.

(21) Appl. No.: 10/319,752

(22) Filed: Dec. 13, 2002

(65) Prior Publication Data

US 2003/0139299 A1 Jul. 24, 2003

Related U.S. Application Data

(60) Provisional application No. 60/341,492, filed on Dec. 17, 2001.

(51) Int. Cl.
*E21B 43/15* (2006.01)
*E21B 43/24* (2006.01)

(52) U.S. Cl. .................. 166/275; 166/276; 166/300

(58) Field of Classification Search ............. 166/266, 166/268, 403, 275, 276, 300, 310
See application file for complete search history.

(56) References Cited

U.S. PATENT DOCUMENTS

| | | | |
|---|---|---|---|
| 2,241,273 A | 5/1941 | Robinson et al. ........... 507/102 |
| 2,300,590 A | 11/1942 | O'Brien ...................... 507/102 |
| 2,996,450 A | 8/1961 | Zech et al. ................. 507/103 |
| 3,108,441 A | 10/1963 | Watson ........................... 61/36 |
| 3,149,669 A | 9/1964 | Binder, Jr. et al. ......... 166/400 |
| 3,208,515 A | 9/1965 | Meadors ..................... 166/268 |
| 3,330,348 A | 7/1967 | Hardy et al. ............... 166/268 |
| 3,356,138 A | 12/1967 | Davis, Jr. et al. ........... 507/202 |
| 3,380,531 A | 4/1968 | McAuliffe et al. ............ 166/45 |
| 3,386,514 A | 6/1968 | Weber ......................... 166/42 |
| 3,412,792 A | 11/1968 | Parker et al. .................. 166/9 |
| 3,443,640 A | 5/1969 | Klein ......................... 166/294 |
| 3,472,319 A | 10/1969 | McAuliffe ................... 166/270 |
| 3,490,471 A | 1/1970 | Carlin ........................ 137/13 |
| 3,509,951 A | 5/1970 | Enochs ........................ 175/70 |
| 3,630,953 A | 12/1971 | Simon et al. ............... 252/312 |
| 3,707,459 A | 12/1972 | Mason et al. ................. 208/76 |
| 3,721,295 A | 3/1973 | Bott .......................... 166/294 |
| 3,749,171 A | 7/1973 | Marx ......................... 166/274 |
| 3,796,266 A | 3/1974 | Carlin et al. ............ 166/305 R |
| 3,804,760 A | 4/1974 | Darley ................... 252/8.55 R |

(Continued)

FOREIGN PATENT DOCUMENTS

CA    849884    8/1970

(Continued)

OTHER PUBLICATIONS

Soo, H., Williams, M.C., and Radke, C.J. "A Filtration Model For The Flow of Dilute, Stable Emulsion In Porous Media-Ii. Parameter Evaluation And Estimation",*Chemical Engineering Science*, vol. 41, No. 2 (1986) pp. 273-281.

(Continued)

*Primary Examiner*—Frank S. Tsay

(57) ABSTRACT

A solids-stabilized oil-in-water emulsion and a method for preparing the solids-stabilized oil-in-water emulsion. The oil-in-water emulsion is formed by combining oil, water, solid particles and a pH enhancing agent and mixing until the solid-stabilized oil-in-water emulsion is formed. The low viscosity oil-in-water emulsion can be used to enhance production of oil from subterranean reservoirs. The low viscosity oil-in-water emulsion can also be used to enhance the transportation of oil through a pipeline.

15 Claims, 1 Drawing Sheet

U.S. PATENT DOCUMENTS

| | | |
|---|---|---|
| 3,818,989 A | 6/1974 | Christopher, Jr. et al. .................. 166/275 X |
| 3,866,680 A | 2/1975 | Dauben .................. 166/273 |
| 3,915,920 A | 10/1975 | Slovinsky et al. .. 260/29.6 RW |
| 3,929,190 A | 12/1975 | Chang et al. .................. 166/274 |
| 3,965,986 A | 6/1976 | Christopher .................. 166/292 |
| 3,980,136 A | 9/1976 | Plummer et al. .................. 507/202 |
| 3,996,180 A | 12/1976 | Kane .................. 260/29.6 H |
| 4,011,908 A | 3/1977 | Holm .................. 166/273 |
| 4,012,329 A | 3/1977 | Hayes et al. .................. 516/22 |
| 4,034,809 A | 7/1977 | Phillips et al. .................. 166/270 |
| 4,083,403 A | 4/1978 | Carlin et al. .................. 166/252 |
| 4,085,799 A | 4/1978 | Bousaid et al. .................. 166/272 |
| 4,096,914 A | 6/1978 | McLaughlin et al. .................. 166/307 |
| 4,100,966 A | 7/1978 | Bousaid .................. 166/273 |
| 4,163,476 A | 8/1979 | Tate .................. 166/271 |
| 4,192,753 A | 3/1980 | Pye et al. .................. 252/8.5 A |
| 4,200,151 A | 4/1980 | Tate .................. 166/271 |
| 4,216,828 A | 8/1980 | Blair .................. 166/274 |
| 4,219,082 A | 8/1980 | Kalfoglou .................. 166/273 |
| 4,233,165 A | 11/1980 | Salathiel et al. .................. 507/937 X |
| 4,248,304 A | 2/1981 | Phillips .................. 166/300 |
| 4,274,956 A | 6/1981 | Stewart .................. 210/638 |
| 4,276,935 A | 7/1981 | Hessert et al. .................. 166/294 X |
| 4,282,928 A | 8/1981 | McDonald et al. .................. 166/268 |
| 4,298,455 A | 11/1981 | Huang .................. 208/48 |
| 4,359,391 A * | 11/1982 | Salathiel et al. .................. 507/277 |
| 4,384,997 A | 5/1983 | Detroit .................. 260/124 |
| 4,391,925 A | 7/1983 | Mintz et al. .................. 523/130 |
| 4,411,770 A | 10/1983 | Chen et al. .................. 208/111 |
| 4,475,594 A | 10/1984 | Drake et al. .................. 166/294 |
| 4,488,602 A | 12/1984 | Lepper .................. 166/274 |
| 4,505,828 A | 3/1985 | Lipowski et al. .................. 166/267 |
| 4,525,285 A | 6/1985 | Son et al. .................. 252/8.5 M |
| 4,592,830 A | 6/1986 | Howell et al. .................. 208/94 |
| 4,659,453 A | 4/1987 | Kukes et al. .................. 208/108 |
| 4,705,110 A | 11/1987 | Balzer .................. 166/274 |
| 4,706,749 A | 11/1987 | Hayes et al. .................. 166/267 |
| 4,732,213 A | 3/1988 | Bennett et al. .................. 166/292 |
| 4,741,401 A | 5/1988 | Walles et al. .................. 166/300 |
| 4,780,243 A | 10/1988 | Edgley et al. .................. 507/202 |
| 4,790,382 A | 12/1988 | Morrow et al. .................. 166/274 |
| 4,856,588 A | 8/1989 | Borchardt .................. 166/273 |
| 4,888,108 A | 12/1989 | Farnand .................. 208/424 |
| 4,966,235 A | 10/1990 | Gregoli et al. .................. 166/267 |
| 5,031,698 A | 7/1991 | Borchardt et al. .................. 166/272 |
| 5,080,809 A | 1/1992 | Stahl et al. .................. 252/999 |
| 5,083,613 A * | 1/1992 | Gregoli et al. .................. 166/275 |
| 5,095,986 A | 3/1992 | Naae et al. .................. 166/274 |
| 5,294,353 A | 3/1994 | Dill .................. 166/275 |
| 5,302,293 A | 4/1994 | Kaplan et al. .................. 210/701 |
| 5,350,014 A | 9/1994 | McKay .................. 166/263 |
| 5,360,558 A | 11/1994 | Pakulski et al. .................. 507/202 |
| 5,373,901 A | 12/1994 | Norman et al. .................. 166/300 |
| 5,424,285 A | 6/1995 | Stacy et al. .................. 507/202 |
| 5,490,940 A | 2/1996 | Bragg et al. .................. 210/671 |
| 5,499,677 A | 3/1996 | Cowan .................. 166/300 |
| 5,603,863 A | 2/1997 | Dahms .................. 516/22 |
| 5,627,143 A | 5/1997 | Sawdon .................. 507/103 |
| 5,780,395 A | 7/1998 | Sydansk .................. 507/202 |
| 5,855,243 A | 1/1999 | Bragg .................. 166/275 |
| 5,910,467 A | 6/1999 | Bragg .................. 507/202 |
| 5,927,404 A | 7/1999 | Bragg .................. 166/275 |
| 5,942,469 A | 8/1999 | Juprasert et al. .................. 507/202 |
| 5,948,242 A | 9/1999 | Ohsol et al. .................. 208/181 |
| 5,964,906 A | 10/1999 | Layrisse et al. .................. 44/302 |
| 5,985,177 A | 11/1999 | Yoshida et al. .................. 252/309 |
| 6,022,471 A | 2/2000 | Wachter et al. .................. 208/120 |
| 6,035,933 A | 3/2000 | Khalil et al. .................. 166/263 |
| 6,059,036 A | 5/2000 | Chatterji et al. .................. 166/294 |
| 6,068,054 A | 5/2000 | Bragg .................. 166/270 |
| 6,069,178 A | 5/2000 | Layrisse et al. .................. 516/50 |
| 6,105,672 A | 8/2000 | Deruyter et al. .................. 166/270.1 |
| 6,162,766 A | 12/2000 | Muir et al. .................. 507/267 |
| 6,225,262 B1 | 5/2001 | Irwin et al. .................. 507/203 |
| 6,227,296 B1 | 5/2001 | Reppert et al. .................. 166/305.1 |
| 6,291,406 B1 | 9/2001 | Rose et al. .................. 507/239 |
| 6,302,209 B1 | 10/2001 | Thompson, Sr. et al. 166/305.1 |
| 6,325,147 B1 | 12/2001 | Doerler et al. .................. 166/252.1 |
| 6,410,488 B1 | 6/2002 | Fefer et al. .................. 507/103 |
| 6,524,468 B2 | 2/2003 | Varadaraj et al. .................. 208/5 |
| 6,544,411 B2 | 4/2003 | Varadaraj .................. 208/265 |
| 6,569,815 B2 | 5/2003 | Varadaraj .................. 507/269 |
| 6,632,778 B1 | 10/2003 | Ayoub et al. .................. 507/202 |
| 6,716,282 B2 | 4/2004 | Griffith et al. .................. 106/705 |
| 6,734,144 B2 | 5/2004 | Varadaraj et al. .................. 507/103 |
| 6,800,193 B2 | 10/2004 | Varadaraj .................. 208/106 |
| 2001/0049902 A1 | 12/2001 | Varadaraj et al. .................. 44/301 |
| 2002/0033265 A1 | 3/2002 | Varadaraj .................. 166/303 |
| 2003/0220204 A1 | 11/2003 | Baran, Jr. et al. .................. 507/200 |
| 2004/0014821 A1 | 1/2004 | Varadaraj .................. 516/53 |
| 2004/0122111 A1 | 6/2004 | Varadaraj et al. .................. 516/21 |

FOREIGN PATENT DOCUMENTS

| | | |
|---|---|---|
| CA | 2044473 | 12/1992 |
| EP | 0 130 632 A2 | 1/1985 |
| EP | 0175511 | 1/1988 |
| RU | 2057914 C1 | 4/1996 |
| SU | 1682539 A1 | 11/1989 |
| SU | 1796013 A3 | 2/1993 |
| WO | WO 95/15812 | 6/1995 |
| WO | WO 95/23909 | 9/1995 |
| WO | WO.95/23909 | 9/1995 |
| WO | WO 98/53181 | 11/1998 |
| WO | WO 01/81502 A2 | 11/2001 |
| WO | WO 01/81502 A3 | 11/2001 |
| WO | WO 01/81718 | 11/2001 |
| WO | WO 01/83637 | 11/2001 |
| WO | WO 03/100214 A1 | 12/2003 |

OTHER PUBLICATIONS

Menon, V.B. and Wasan, D.T. "Characterization of Oil—Water Interfaces Containing Finely Divided Solids with Applications to the Coalescence of Water-in-Oil Emulsions: A Review", *Colloids and Surfaces*, 29 (1988) pp. 7-27.

Sundstrom, Donald W. and Klei, Herbert E. "Wastewater Treatment", *Department of Chemical Engineering, The University of Connecticut* (1979) pp. 10-13.

Chung, Keng H. and Butler, Roger M. "In-Situ Emulsification By The Condensation Of Steam In Contact With Bitumen", *39th Annual Technical Meeting of the Petroleum Society of CIM* (Jun. 12-16, 1988) Paper No. 88-39-18 pp. 18-1 to 18-17.

Rege, S.D. and Fogler, H.S. "A Network Model for Deep Bed Filtration of Solid Particles and Emulsion Drops", *AIChE Journal*, vol. 34, No. 11 (Nov. 1988) pp. 1761-1772.

Fiori, Marco and Farouq Ali, S.M. "Optimal Emulsion Design For The Recovery Of A Saskatchewan Crude", *40th Annual Technical Meeting of the Petroleum Society of CIM* (May 28-31, 1989) Paper No. 89-40-43, pp. 43-1 to 43-28.

Mikula, R.J., Munoz, V.A., and Lam, W.W. "Microscopic Characterization of Emulsion Interfaces", *1989 Eastern Oil Shale Symposium* (Nov. 15-17, 1989) Institute for Mining and Minerals Research, University of Kentucky, pp. 287-292.

Levine, S. and Bowen, B.D. "Capillary interaction of spherical particles adsorbed on the surface of an oil/water droplet stabilized by the particles. Part I", *Colloids and Surfaces*, 59 (1991) pp. 377-386.

Levine, S. and Bowen, B.D. "Capillary interaction of spherical particles adsorbed on the surface of an oil/water droplet stabilized by the particles. Part II", *Colloids and Surfaces*, 65 (1992) pp. 273-286.

Mendoza, Humberto, Thomas, Sara and Farouq Ali, S.M. "Effect Of Injection Rate On Emulsion Flooding For A Canadian And A Venezuelan Crude Oil", *CIM/AOSTRA 1991 Technical Conference* (Apr. 21-24, 1991) Paper No. CIM/AOSTRA 91-26, pp. 26-1 TO 26-6.

Friesen, W.I. and Levine, S. "Electrostatic Interaction between Two Water-in-Oil Emulsion Droplets in an Electric Field", *Journal of Colloid and Interface Science*, vol. 150 No. 2 (May 1992) pp. 517-527.

Chen, Techlen; Chakrabarty, Tapan; Cullen, Malcolm P.; Thomas, Ray R; and Sieben, Michelle C. "Laboratory And Field Evidence Of Emulsion Flow In Porous Media", *CIM/AOSTRA 1991 Technical Conference* (Apr. 21-24, 19910 Paper No. CIM/AOSTRA 91-78, pp. 78-1 to 78-14.

Yuan, F. and Pal, R. "Composition Measurement Of Emulsions And Emulsions With Added Solids Using A Microwave Technique", Sixth Petroleum Conference of The Petroleum Society of CIM, (Oct. 16-18, 1995) Paper No. 95-148, pp. 1-15.

Broz, J.S., French, T.R., and Carroll, H. B. "Blocking Of High Permeability Zones In Steamflooding By Emulsions", *Third International Conference on Heavy Crude and Tar Sands*, (Jul. 22-31, 1985) vol. 1, pp. 443-451.

Dieken, F.P, Skinner, F.W., Wharmby, A.W., and Wu, S. "Methods Manual For Chemical Analysis Of Water And Wastes", Alberta Research Council (Updated Oct. 1, 1996) pp. 1-4.

Tronov, V.P. and Shireyev, A.I. "Effect Of Desalinization Of Stratal Water On Rheological And Demulsification Properties Of Forming Emulsions", Tatar Scientific Research and Planning Institute of the Petroleum Industry (1991).

International Preliminary Examination Report mailed Mar. 23, 2004 for International Application No. PCT/US02/39949, filed on Dec. 13, 2002, 21 pages.

Bragg, J. R. et al., "Recent Applications of the Single Well Tracer Methods for Measuring Residual Oil Saturation," SPE of AIME, Mid-Continent Section, Improved Oil Recovery Symposium Preprint, No. SPE-5805, pp. 103-113 (1976).

Bragg, J. R. et al., "Loudon Surfactant Flood Pilot-Overview and Update," 3rd SPE of AIME Middle East Oil Show Conf. (Bahrain, Mar. 14–17, 1983) Proc., pp. 525-536 (1983) (SPE11505).

Bragg, J. R. et al., "Measuring Well Injection Profiles of Polymer-Containing Fluids," 3rd Joint SPE/DOE Enhanced Oil Recovery Symposium (Tulsa, Apr. 4–7, 1982) Proc., pp. 953-962 (1982) (SPE/DOE 10690).

Bragg, J. R. et al., "Loudon Sufactant Floor Pilot test," 3rd Join SPE/DOE Enhanced Oil Recovery Symposium (Tulsa, Apr. 4–7, 1982) Proc., pp. 933-952 (1982) (SPE/DOE 10862).

Bragg, J. R., "In Situ Measurement of Residual Oil Saturation," 23rd Annual Southwestern Petroleum Short Course Assoc. Mtg., Proc. pp. 183-189 (1976).

Bragg, J. R. et al., "Control of Xanthan-Degrading Organisms in the Loudon Pilot: Approach, Methodology, and Results," 58th Annual SPE of AIME Tech. Conf. (San Francisco Oct. 5–8, 1983) Preprint No. SPE 11989, 12 pages (1983).

Civan, F. et al., "Characterization of Corrosion-Inhibiting Emulsions for Continuous Well Treatment," SPE International Oilfield Symposium, Houston, Texas, Feb. 16-19, 1999, SPE 50719, pp. 191-206, (1999).

Civan, F. and Weers, Jerry J., "Laboratory and Theoretical Evaluation of Corrosion-Inhibiting Emulsions," SPE Production & Facilities vol. 16 (4), pp. 260-266 (2001) (SPE 74271).

Abstract of: Czarnecki, J. et al., "Emulsion Studies Associated with Bitumen Recovery from Canadian Oil Sands: Part I," AICHE Spring Nat. Mtg. (Mar. 10-14, 2002) (Abstract only).

Des Brisay et al., "Pumping Heavy Oils With The Aid of Downhole Oil-In-Water Emulsification," 38th Annual CIM Petroleum Soc. Tech. Mtg. (Calgary, Canada, Jun. 7–10, 1987), Preprints V. 1, pp. 297-309 (1987) (Paper No. 87-38-16).

De Vries, Arnold S. and Wit, Krijn, Rheology of Gas/Water Foam in the Quality Range Relevant to Steam Foam, SPE 18075 (May 1990). (Original SPE manuscript received for review Oct. 2, 1988. Paper accepted for public ation Jun. 23, 1989. Revised manuscript received Aug. 30, 1989. Paper (SPE 18705) first presented at the 1988 SPE Annual Technical Conference and Exhibition held in Houston, Oct. 2-5.).

Dotson, C., Huff and R., Haskin, S. R., "Report on the Start-up of a Unique Hydrocyclone-Based System for Treating Produced Water", *Produced Water 2*, Plenum Press, pp. 431-445, (1996).

Farrel, James and Marsden, Jr., S. S., "Foam and Emulsion Effects on Gas Driven Oil Recovery," SUPRI-TR-62, DOE/BC/14126-3, Performed Under Contract No. FG19-87BC14126 and AC03-81SF11564 (Nov. 1988).

Felian, B. et al., "Investigation of Crude Oil-Water Emulsions in Presence of Non-Ionic Surfactants, I. Behavior of Emulsions at Room Temperature and in Ion-Free systems", Acta Physica et Chemica, v 29 (3-4), pp. 223-232, (1983).

Felian, B. et al., "Investigation of Crude Oil-Water Emulsions in Presence of Non-Ionic Surfactants, II. Behavior of Emulsions at Elevated Temperatures, and Emulsification of Crude Oil Fractions", Acta Physuca et Chemica, v 30 (3*4), pp. 183-192, (1984).

Fraim, M. L. et al., "Laboratory Testing and Simulation Results for High Pressure Air Injection in a Waterflooded North Sea Oil Reservoir,"SPE 38905, SPE Annual Technical Conference & Exhibition, San Antonio, U.S.A. (Oct. 5-8, 1997).

French, T. R. et al., "Use of Emulsion for Mobility Control During Stearnflooding," 56th Annu SPE Calif Reg Mtg (Oakland, Calif, Apr. 2–4, 1986) Proc V. 1 pp. 43-54 (1986) (SPE-15052).

"Fundamental Processes,"CPGE Fundamental Processes Staff Other CPGE Research, http:www.cpge.utexas.edu/fp, pp. 1-3, printout dated Jul. 17, 2003.

Garthoffner, E. H., "The Role of Oil-in-Water Emulsions in Thermal Oil Recovery Processes", SPE OF AIME California Regular Meeting, SPE 7952, 8 pp, (Apr. 1979).

Gotbunov, A. T. et al., "In Situ Emulsification During Thermal Alkali Flooding", Neft Khoz No. 7, pp. 42-45, (Jul. 1984).

Abstract of: Gotbunov, A. T. et al., "In Situ Emulsification During Thermal Alkali Flooding", Neft Khoz No. 7, pp. 42-45, (Jul. 1984).

Hall, B. E. and Lasater, R.M., "Surfactants for Well Stimulation", 159th Natl. American Chemical Society Meeting, (Feb. 1970).

Heathman, James et al., "New Test Procedures Optimize Surfactant Blends", Oil & Gas Journal v. 97 (40), pp. 71-74, (1999).

Humenick, Michael J. et al., "High Rate Filtration of Solids-Stabilized Oil-In-Water Emulsions," Technical Report CRWR-105, EHE-73-06, University of Texas, Austin (Dec. 1973).

Henry, Deborah and Fuhr, Bryan, "Preparation of Bitumen from Oil Sand by Ultracentrufigation," Technical Report CRWR-105, EHE-73-06, University of Texas, Austin (Dec. 1973).

"Improved Displacement and Sweep Efficiency in Gas Flooding," CPGE Reservoir Engineering, http://www.cpge.utexas.edu/re/gas_flooding.html, pp. 1-2, printout dated Jul. 17, 2003.

Kimmel, T. B., "Heavy Oil Emulsion Treating in Canada," 3rd Int'l Unitar/UNDP Heavy Crude & Tar Sands Conf. (Long Beach Calif., Jul. 22–31, 1985) Preprints V. 4, pp. 1970-1979 (1985) (Paper No. HCTS/CF 3/15 6).

Leuchenberg, Chiristian et al., "Development and Performance of Surface Equipment for High Temperature Underbalance Drilling in a Sour, Severely Under Pressure Formation," Energy Sources Technology Conference & Exhibition, ASME, ETCE99-6618 (1999).

Abstract of: Masliyah, Jacob et al., "Emulsion Studies Associated with Bitumen Recovery from Canadian Oil Sands: Part I," Pre-print Archive, American Institute of Chemical Engineers, Spring National Meeting, pp. 1648, (Mar. 11-14, 2002) (Abstract only).

Pal, R. et al., "Rheology of Clay-in-Oil Suspensions with Added Water Droplets," Chemical Engineering Science, vol. 47, No. 5, pp. 967-70 (Apr. 1992).

Petroleum Engineering Department, Colorado School of Mines, "Foam and Conformance Technologies (FACT)," FACT News, http://www.mines.edu/research/fact/indexold.html, pp. 1-7 May 1996.

Preuss, K. and Wu, Y. S., "On PVT - Data, Well Treatment, and Preparation of Input Data for an Isothermal Gas-Water-Foam Version of MULKOM," Earth Sciences Division, Lawrence Berkeley Laboratory, Univ. of Calif., Prepared for Gas Research Institute, GRI Contract Number 5086-271-1160 (Aug. 1988).

Price-Smith, C. et al., "Laboratory Development of a Novel, Synthetic Oil-Based Reservoir Drilling and Gravel-Pack Fluid System that Allows Siumultaneous Gravel-Packing and Cake-Cleanup in Open-Hole Completions", SPE Asia Pacific Oil * Gas Conference, SPE64399, 6 pages (2000).

Reilly, Bernard T. and Scott, George R., "Cold Lake Recovery and the Role of Foamy Emulsion," SPE 30287, International Heavy Oil Symposium, Calgary, Alberta, Canada (Jun. 19-21, 1995).

Reppert, T. R. et al., "Second Ripley Surfactant Flood Pilot Test," 7th SPE/DOE Enhanced Oil Recovery Synposium (Tulsa, Apr. 22–25, 1990) Proc., pp. 463-474 (1990) (SPE/DOE-20219).

Sarbar, M. et al., The Effect of Chemical Additives on the Stability of Oil-In-Water Emulsion Flow Through Porous Media, 38th Annu CIM Petrol Soc Tech Mtg (Calgary, Canada, Jun. 7–10, 1987) Preprints V. 2, pp. 431-453 (1987) (Papere No. 87-38-25).

Sarma, H. K. et al., "Evaluation of Emulsified Solvent Flooding for Heavy Oil Recovery," 46th Annu CIM Petrol Soc Mtg (Banff, Canada, May 14–17, 1995) Proc V.2, Paper No. CIM 95-66 (1995).

Schramm, Laurier L., "Foams Can Be Effective in the Presence of Oil," http://www.ucalgary.ca/~schramm/foamoil.htm, pp. 1-3 (1996).

Takamara, K. and Chow, R., "The Stability of Bitumen Emulsion", Energy Process v. 74, No. 7, pp. 29-31, (Sep.-Oct. 1982).

Thomas, F. Brent et al., "Water Shutoff Treatments - Reduce Water and Accelerate Oil Production", Paper No. 98-47, 49th Annual Technical Meeting of the Petroleum Society of CIM, Calgary, Alberta, Canada, Jun. 8-10 (1998).

Thompson, D. G. et al., "Emulsification and demulsification related to crude oil production," Colloids and Surfaces, vol. 15 (3-4) pp. 175-89 (1985).

United States Department of Energy Office of Fossil Energy, Project Fact Sheet, "Development of More-Efficient Gas Flooding Applicable to Shallow Reservoirs/Mega PRD," http://dominoweb.fossil.energy.gov/domino, pp. 1-3, printout dated Jul. 17, 2003.

Yan, N. et al., "On water-in-oil emulsions stabilized by fine solids," Colloids and Surfaces, A:Physicochemical and Engineering Aspects, vol. 193, pp. 97-107 (2001).

Yan, Zhoulin et al., "Roles of Various Bitumen Components in the Stability of Water-in-Diluted-Bitumen Emulsions," J. Colloid and Interface Science, vol. 220, pp. 329-337 (1999).

Yang, S.H. and Reed, R.L., "Mobility Control Using $CO_2$ Forms," SPE 19689, 64th Annual TEchnical Conference and Exhibition of the Society of Petroleum Engineers, San Antonio, TX (Oct. 8-11, 1989).

Abstract of: Yeung, K. "Mobility Control by Emulsions Under Bottom Water Conditions," Alberta University, MS Thesis, 1991, Masters Abstr Int V 30, No. 4, p. 1472, Winter (1992). (Abstract Only).

Zhou, Z. A. et al., "Interaction of Ionic Species and Fine Solids with a Low Energy Hydrophibic Surface from Contact Angle Measurement," J. Colloid and Interface Science, vol. 204, pp. 342-349 (1998).

Gorbunov, A. T. et al., "In Situ Emulsification During Thermal Alkali Flooding," Neft Khoz No. 7, pp. 42-45, (Jul. 1984) (with English language translation).

* cited by examiner

SOLIDS-STABILIZED OIL-IN-WATER EMULSION AND A METHOD FOR PREPARING SAME

CROSS-REFERENCE TO RELATED APPLICATIONS

This application claims priority benefit from U.S. provisional application No. 60/341,492 filed on Dec. 17, 2001.

FIELD OF INVENTION

This invention relates to a solids-stabilized oil-in-water emulsion and a method for preparing same. In particular, the invention relates to a method for reducing the effective viscosity of oil by incorporating the oil into a solids-stabilized oil-in-water emulsion.

BACKGROUND OF INVENTION

Recovery of oil from a reservoir usually results in simultaneous production of water with the oil. In many cases the oil and water are subject to mixing and shearing in subsurface pumps, and this results in the formation of water-in-oil or oil-external emulsions having a viscosity that is substantially higher than that of the original, "dry oil". Because of wellbore hydraulics, the production of this oil-external emulsion, with its higher viscosity, increases lifting costs (larger pumps and more electrical power requirements) and often limits the production rate from the well, which reduces economic profitability. Often, demulsifier chemicals are added to the subterranean formation to either prevent emulsion formation or to break the oil-external, high viscosity emulsion. The added demulsifier chemicals are expensive speciality products and need to be customized to the oil, emulsion and reservoir characteristics in order for the desired performance to be achieved. What is needed is a simple, economic method for reducing the viscosity of the oil-water mixture.

Moreover, in some cases the original oil is so viscous, such as with some heavy oils, that even if no water is produced from the reservoir and no oil-external emulsion is formed, the production rate of the oil is nonetheless limited because of its high viscosity. Accordingly, a simple, economic method for reducing the effective viscosity of highly viscous oil is also needed.

A related problem in the production of oil is a need to obtain an increased flowrate of the oil through a pipeline, for example, a pipeline used to transport oil from the point of production to points of collection, transportation, or sale. The viscosity of the oil is a limiting factor in the efficient transportation of oil. As the viscosity of the oil increases, so do the related costs of transportation, such as pumping costs. Existing methods for increasing pipeline capacity are to heat the oil, dilute the oil with less-viscous hydrocarbon diluents, treat the oil with drag reducers, transport the oil in a core annular flow, or convert the oil into an oil-in-water (or water-external) emulsion having a viscosity lower than that of the dry oil. Methods for making water-external emulsions include adding expensive surfactants or adding surfactants simultaneously with raising the pH of the water-oil mixture by adding base such as sodium hydroxide or ammonium hydroxide. However, for many oils, these treatments do not result in emulsions that remain sufficiently stable for the long times needed to transport the oil to market. A need exists for an inexpensive method for making a water-external emulsion that remains stable for long periods of time, and can be easily and economically demulsified and separated into the constituent oil and water.

SUMMARY OF INVENTION

This invention is a solids-stabilized oil-in-water emulsion, and a method for preparing a solids-stabilized oil-in-water emulsion.

In an embodiment of the invention, the solids-stabilized oil-in-water emulsion is used to enhance the production of oil from a subterranean reservoir.

In another embodiment of the invention, the solids-stabilized oil-in-water emulsion is used to enhance the transportation of oil through pipelines.

DETAILED DESCRIPTION OF THE INVENTION

Figure 1:
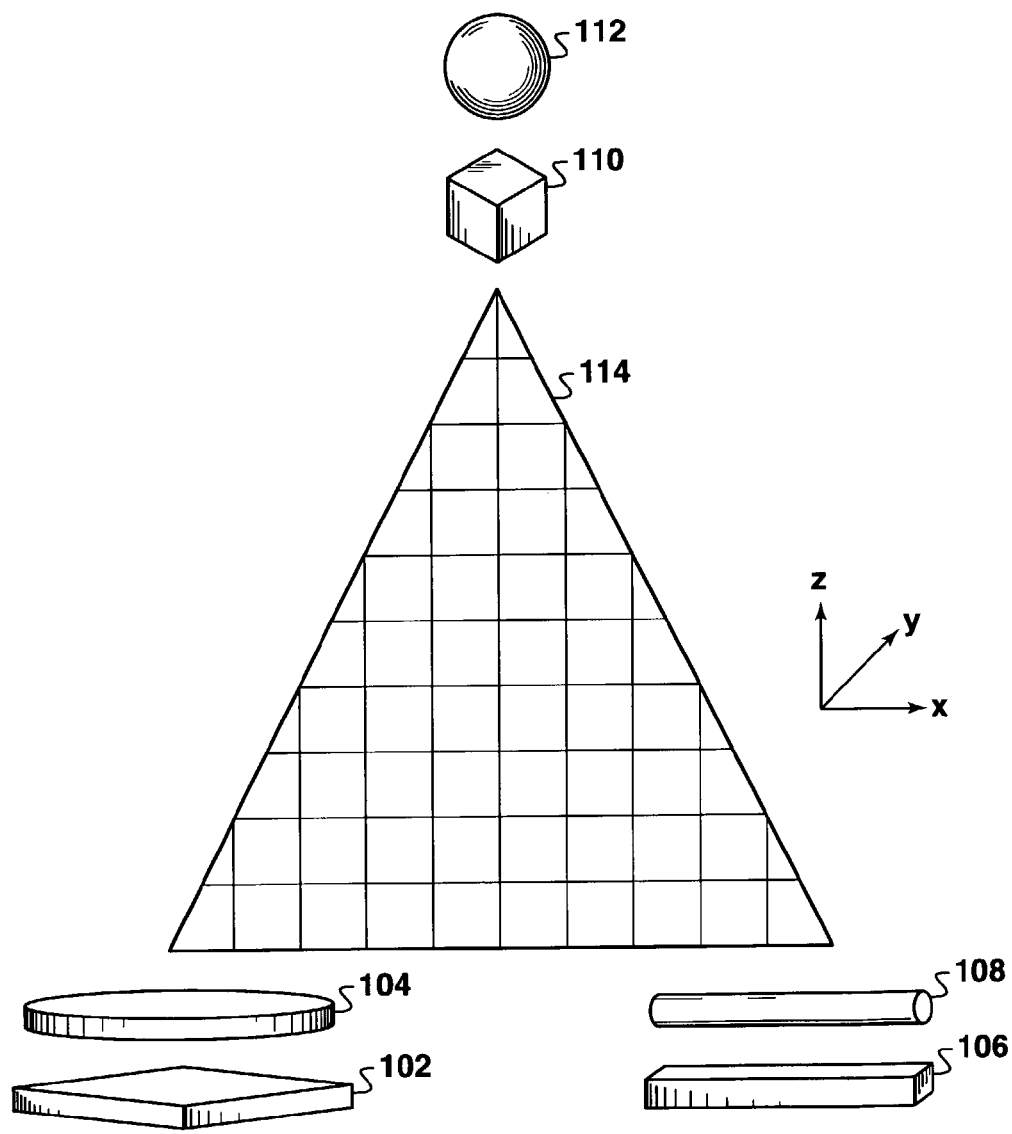
FIG. 1 is a ternary diagram that illustrates some, but not all, of the particle shapes that could be characteristic of the solid particles used to make the solids-stabilized oil-in-water emulsion of this invention.

This invention provides a solids-stabilized oil-in-water emulsion and a method of making a solids-stabilized oil-in-water emulsion. To make a solids-stabilized oil-in-water emulsion pursuant to this invention, solid particles and a pH enhancing agent are added to water and mixed with oil until the solids-stabilized oil-in-water emulsion is formed.

The solid particles useful for this invention should have certain physical properties. If the solid particles are to be used in a porous subterranean formation, as will be explained in more detail, the average particle size should be smaller than the average diameter of the pore throats in the porous subterranean formation. At least one size measurement dimension of the actual individual particle size should be sufficiently small to provide adequate surface area coverage of the droplets of oil that are formed within the external water phase. Particle size can be measured by a wide array of particle size analytical techniques, including laser light scattering, mesh screen classification, Coulter counting method, and settling velocity (which uses Stokes law to convert a solid sample's settling velocity in a fluid to an average particle size). However, each of these techniques produces an "effective" particle diameter, which is the result that would have been produced by corresponding test sample comprised of particles with a spherical shape. Consequently, a particle's effective diameter becomes a less accurate approximation of its true size as the particle's shape deviates further from a spherical shape. In most instances, however, particles are often irregular and nonuniform in shape.

Without intending to limit the scope of the invention, FIG. 1 illustrates this point with a ternary diagram, 114, having three fundamental shape groups. The first group is a plate or pie shape, 102 and 104; the second is a bar or cylinder shape, 106 and 108, and the third is a cube or sphere shape, 110 and 112. Typically, particles composing the solids used for making a solids-stabilized emulsion disclosed herein will have some composite irregular shape that is somewhere between the two or three basic shape groups illustrated in ternary diagram, 114. Accordingly, the size of particles composing such solids are preferably determined using a scanning probe microscopy (SPM) technique. One example of such a technique is atomic force microscopy. Digital Instruments of Santa Barbara, Calif. manufactures an atomic force microscope (AFM) known as the Nanoscope Multimode™, which has been used to characterize the average size and shape of some of the solid particles used in the working examples disclosed below.

Using AFM or some other SPM technique the maximum dimensions of a particle along its x, y, and z axes can be determined. Therefore, unless reference to an alternative particle size analysis method is otherwise indicated, reference to a particle size will mean the smallest of the three dimensions measured along a particle's x, y, and z axis, as measured by a SPM technique. In the case of a perfect sphere, 112, or cube, 110, each dimension is equal while in the case of a particle having the shape of a pie, 104, or plate, 102, the thickness of the particle, as measured along the z axis, is small relative to it length, x, and width y. The "average" particle size for a particular sample can be determined by obtaining a sufficient number of measurements, preferably 50 or more, of the smallest dimension for the array of particles being analyzed. The average size can be calculated using either the number of particles among the total measured having a particular x, y, or z value, whichever is smallest, or the weight contribution of the particles having a particular x, y, or z value, whichever is smallest, among the total weight for all particles measured.

If spherical in shape, the solid particles should preferably have an average size of about ten microns or less in diameter, more preferably about two microns or less, even more preferably about one micron or less and most preferably, 100 nanometers or less. If the solid particles are non-spherical in shape, they should preferably have an average surface area of about 200 square microns or less, more preferably about 20 square microns or less, even more preferably about ten square microns or less and most preferably, one square micron or less. The solid particles must also remain undissolved in both the oil and water phase of the emulsion under the conditions for which the emulsion is used.

The preferred solid particles are hydrophilic in nature, which include but are not limited to hydrophilic exfoliated clay, silica, carbonaceous solids and mixtures thereof. Hydrophilic silica, for example Aerosil-130™ sold by Degussa Corp. can also be used. Carbonaceous solids like refinery generated coke can also be used to prepare solids-stabilized oil-in-water emulsions. Refinery coke is generally a hydrophilic carbonaceous solid that can be ground to a powder of sufficient size for this invention. Montmorillonite clays, for example Bentonite and Kaolinite clays are also suitable for preparing the solids-stabilized oil-in-water emulsion. Bentonite clay is suitable because it can be easily exfoliated or divided by methods known in the art for exfoliation or division of clays. As mined, bentonite clays naturally consist of aggregates of particles that can be dispersed in water and broken up by shearing into units having average particle sizes of 2 microns or less. However, each of these particles is a laminated unit containing approximately 100 layers of fundamental silicate layers of 1 nm thickness bonded together by inclusions of atoms such as calcium in the layers. By exchanging the atoms such as calcium by sodium or lithium (which are larger and have strong attractions for water molecules in fresh water), and then exposing the bentonite to fresh water, the bentonite can be broken into individual 1 nm thick layers, called fundamental particles. The chemistry of this delamination process is well known to those skilled in the art of clay chemistry. The result of this delamination process is a gel consisting of divided bentonite clay.

Also, the source of the solids used for making a solids-stabilized oil-in-water emulsion may be indigenous to the formation where such emulsion is used, hereinafter known as formation solids or formation solid particles, or may be obtained external to the formation, whether taken from another formation, mined, or synthesized, hereinafter known as nonformation solids. In certain instances, in fact, both formation and nonformation solids may be compositionally similar, but simply derived from different sources.

The pH enhancing agent can be any agent that will raise the pH of the final emulsion, preferably to a range of about 7.5 to about 10. It is believed that if the final emulsion is not of a sufficient basicity, the solid particles which are initially hydrophilic (and provide stability to the water-external emulsion) gradually become hydrophobic because of slow absorption of polar hydrocarbons from the oil. A solids-stabilized oil-in-water emulsion formed without sufficient basicity will eventually invert to a water-in-oil (or oil-external) emulsion, which is undesirable for this invention. The preferred pH enhancing agent for this invention is a base, or mixture of bases. Preferred basic solutions include sodium hydroxide, potassium hydroxide, ammonium hydroxide, tertiary butyl ammonium hydroxide or mixtures thereof. A typical treat rate of a basic solution is between about 0.005 wt % to about 5.0 wt % based on the weight of the water.

The water used to form the emulsion preferably contain salts of Group I and Group II elements. Chlorides, sulfates, carbonates are some of the commonly occurring salts in water. Presence of these and other salts have a beneficial effect on emulsion formation and stability.

To make the solids-stabilized oil-in-water emulsion in accordance with this invention, oil can be added to water that contains the solid particles and the basic solution. This method is preferred where the solids-stabilized emulsion is prepared above ground, for example, in a surface facility. Alternatively, water containing the solid particles and the basic solution can be added to the oil, which is preferred for subterranean preparation of a solids-stabilized oil-in-water emulsion. The severity and duration of mixing required to form the solids-stabilized oil-in-water emulsion can be determined by one of ordinary skill in the art based upon such factors as the oil viscosity and oil composition. Mixing in a surface facility can be accomplished using static mixers (e.g., paddle mixers), blade mixers, inline mixers (e.g., plurality of fins in a pipe), or propagation of the oil-water mixture through an orifice. In a subsurface formation of emulsions, the mixing occurs in the subsurface pumps. The percentage of oil in water for the solids-stabilized oil-in-water emulsion can vary between 10% to 90%. The preferred treat rate of solid particles in the emulsion is between about 0.01 wt % to about 5.0 wt % based upon the weight of the oil.

It is preferred to have oil droplets in the size range of 1 micron to 200 microns in diameter suspended in the external water phase. In general, the dispersed oil droplets size distribution can be controlled by increasing the rate and/or duration of mixing and by increasing the concentration of solid particles and/or the pH enhancing agent. Conventional optical microscopy can be used to observe the oil droplets dispersed in water. Alternate methods to determine the oil droplet size distribution are known in the art, and can be used, such as the Coulter Counter method.

The following laboratory experiment and prophetic examples are intended to illustrate examples of making and using the solids-stabilized oil-in-water emulsions of this invention. However, to the extent that the following descriptions are specific to a particular embodiment or a particular use of the invention, this is intended to be illustrative only and is not to be construed as limiting the scope of the invention. On the contrary, it is intended to cover all alternatives, modifications, and equivalents that are included within the spirit and scope of the invention, as defined by the appended claims.

Laboratory Experiment—Reduction of Effective Viscosity of Oil

The viscosity of a sample of dry crude oil was measured to be 320 cp at 140° F. using a Brookfield viscometer. An oil-external emulsion containing 30 volume % (vol. %) water was made with this oil sample, which increased the effective viscosity of the oil (i.e. the viscosity of the water-in-oil emulsion) to 940 cp (140° F. at 380 sec$^{-1}$ shear rate). A water-external emulsion was made with this crude oil sample, also containing 30 vol. % water, by mixing bentonite solid particles (at a treat rate of between 0.01 wt % to about 5 wt % based on the weight of the oil), and 100 ppm of ammonium hydroxide (to bring the pH of the final emulsion to a range of about 7.5 to 10) to the water and oil, and shearing until the water-external emulsion was formed. The resulting water-external emulsion exhibited a viscosity of 91 cp (140° F. at 380 sec$^{-1}$ shear rate), which is a viscosity reduction of 229 cp from the 320 cp viscosity of the dry oil.

Production of Oils Using a Solids-Stabilized Oil-in-Water Emulsion.

An aqueous solution comprising a volume of water containing a pH enhancing agent (for instance a basic solution like ammonium hydroxide), and hydrophilic solid particles (such as bentonite that has been exfoliated into individual, fundamental layers), is pumped into a subterranean oil formation from the surface. The aqueous solution is provided within the subterranean formation at a location so that it contacts the produced oil and connate water (if any) at a depth below where the fluids enter the submersible pump. The aqueous solution, connate water and oil are mixed within the subterranean formation by propagation of the mixture through pores in the formation and/or mixing in the submersible pump thereby forming the solids-stabilized oil-in-water emulsion. The solids-stabilized oil-in-water emulsion has a lower viscosity than the original dry oil and a lower viscosity than the water-in-oil emulsions that can be formed in the formation by mixing of the dry oil and connate water. The low viscosity solids-stabilized oil-in-water emulsion can be produced from the subterranean formation using production methods commonly known in the industry.

The amount of solid particles and basic solution added to the injected water to form the aqueous solution can be determined by one skilled in the art pursuant to the particular characteristics of the subterranean reservoir and oil being produced. The produced oil-in-water emulsion preferably has a final concentration of solid particles in the range of about 0.01 wt % to about 5 wt % based on the weight of the oil. The amount of basic solution added to the injected water should be sufficient to raise the pH of the resulting oil-in-water emulsion to above 7.0, and preferably to a range of 7.5–10. The amount of base needed depends on the acid content (Total Acid Number, TAN) of the oil. For example, for oils whose TAN ranges from 4–7, the amount of ammonia that needs to be added is about 100–200 ppm in the final emulsion. Generally, it is preferred to add an amount of base sufficient to neutralize at least 25% of the acids. The oil-in-water emulsion produced by addition of solid particles and the basic solution will usually remain stable for longer periods of time and have a lower viscosity than an emulsion made by addition of a basic solution alone. Moreover, the resulting water-external emulsion has a substantially lower viscosity than the dry oil alone, and can be lifted at lower cost and at higher rate than either the dry oil alone or the oil-external emulsions usually formed in the wellbore.

Once produced, the solids-stabilized water-external emulsion can be allowed to gravity settle in surface facilities to concentrate the oil content to approximately 70–80 vol. % oil. The excess water can be removed after separation. This water-external emulsion containing 70–80 vol. % oil is well suited for transport in pipelines as described below. To break the water-external emulsion, a sufficient pH reducing agent (such as an acidic solution) can be added to reduce the pH of the emulsion to a value below about 7.0. Water can then be removed by conventional dehydration methods such as using electrostatic coalescence devices or hydrocylones.

Transportation of Oil Using a Solids-Stabilized Oil-in-Water Emulsion.

Water-external emulsions can be transported in pipelines to achieve higher net flowrates of oil than in the transport of dry oil alone. The percentage of oil in water for this embodiment can vary between 10% to 90%, and is preferably in the range of 70 to 80%. In a particular example, oil is combined with an aqueous solution comprising water, a pH enhancing agent (such as a basic solution), and solid particles and mixed until the solids-stabilized oil-in-water emulsion is formed. The amount of basic solution is preferably in a range between about 0.005 wt % to about 5 wt % based upon the weight of the water. The pH of the resulting oil-in-water emulsion should be above 7.0 and preferably be in the 7.5–10 range. The solid particles can be added at a treat range of about 0.01 wt % to about 5 wt % based upon the weight of the oil.

The oil useful for this embodiment of invention can be any oil including but not limited to crude oil, crude oil distillates, crude oil residue, synthetic oil, and mixtures thereof.

In propagating the emulsion through a pipe it is preferred to first contact the inner walls of the pipe with a wettability altering agent to make the inner walls of the pipe water-wet to aid the propagation of the oil-in-water emulsion. The wettability altering agent can be water or another known drag reducer that can be selected by one of ordinary skill in the art. After contacting the inner walls of the pipe with the wettability altering agent, the oil-in-water emulsion can be pumped through the pipe.

High-oil content, solids-stabilized oil-in-water emulsions are therefore good candidates for transportation in pipelines using flow regimes of either self-lubricating core annular flow or as uniform, lower-viscosity water-external emulsions. In core annular flow, forming a low-viscosity annulus near the pipe wall further reduces pressure drop. Because the viscosity of a solids-stabilized oil-in-water emulsions is not greatly affected by temperature (because the viscosity of water, the continuous phase, is not greatly affected by temperature), such oil-in-water emulsions do not have to be heated to high temperature to maintain an acceptably low viscosity for economical transport. Another benefit of the oil-in-water emulsion formed in the above manner is that the oil phase does not tend to wet steel. Thus, these emulsions will have fewer tendencies to wet or "foul" the pipeline walls than oil-external emulsions or dry oil.

The present invention has been described in connection with its preferred embodiments. However, to the extent that the foregoing description was specific to a particular embodiment or a particular use of the invention, this was intended to be illustrative only and is not to be construed as limiting the scope of the invention. On the contrary, it was intended to cover all alternatives, modifications, and equivalents that are included within the spirit and scope of the invention, as defined by the appended claims.

We claim:

1. A method for producing oil comprising:
   contacting said oil in a subsurface location with an aqueous solution comprising water, micron to submicron sized hydrophilic solid particles, and a pH enhancing agent;
   forming a solids-stabilized oil-in-water emulsion; and
   producing said solids-stabilized oil-in-water emulsion from said subsurface location.

2. The method of claim 1, wherein said hydrophilic solid particles are present in said aqueous solution in a range of about 0.01 wt % to about 5 wt % based upon the weight of said oil.

3. The method of claim 1, wherein said hydrophilic solid particles comprise spherically shaped solid particles with an average particle size of less than about 10 microns in diameter.

4. The method of claim 1, wherein said hydrophilic solid particles comprise non-spherically shaped solid particles with an average surface area of less than about 200 square microns.

5. The method of claim 1, wherein a sufficient amount of pH enhancing agent is contacted with said oil to provide said emulsion with a pH in a range of about 7.5 to about 10.

6. The method of claim 1, wherein said pH enhancing agent comprises a basic solution.

7. The method of claim 6, wherein said basic solution is selected from the group consisting of sodium hydroxide, potassium hydroxide, ammonium hydroxide, tertiary butyl ammonium hydroxide and mixtures thereof.

8. The method of claim 6, wherein said basic solution is provided at a concentration of about 0.005 wt % to about 5 wt % based on the weight of the water.

9. The method of claim 1, further comprising adding a pH reducing agent to said produced solids-stabilized oil-in-water emulsion.

10. The method of claim 9, further comprising removing water from said solids-stabilized oil-in-water emulsion.

11. The method of claim 1 wherein the solids-stabilized oil-in-water emulsion is formed in a subsurface pump.

12. The method of claim 1 wherein the solids-stabilized oil-in-water emulsion is formed adjacent to a subsurface pump.

13. A method for producing oil from a subterranean formation, comprising:
    contacting said oil in said subterranean formation with an aqueous solution comprising water, micron to submicron sized hydrophilic formation solid particles, and a pH enhancing agent;
    forming a solids-stabilized oil-in-water emulsion in said subterranean formation; and
    producing said solids-stabilized oil-in-water emulsion.

14. The method of claim 13 wherein said solids-stabilized oil-in-water emulsion is formed in a subsurface pump in said subterranean formation.

15. The method of claim 13 wherein said solids-stabilized oil-in-water emulsion is formed adjacent to a subsurface pump in said subterranean formation.

* * * * *